(12) United States Patent
Yamada (10) Patent No.: US 6,540,409 B1
(45) Date of Patent: Apr. 1, 2003

(54) APPARATUS FOR CREATING AN OPTICAL FIBER LINK

(76) Inventor: Kevin S. Yamada, 1020 Daisy Ct., Sunnyvale, CA (US) 94086

( * ) Notice: Subject to any disclaimer, the term of this patent is extended or adjusted under 35 U.S.C. 154(b) by 0 days.

(21) Appl. No.: 09/522,255

(22) Filed: Mar. 9, 2000

(51) Int. Cl.⁷ .................................................. G02B 6/38
(52) U.S. Cl. ........................... 385/59; 385/71; 385/134
(58) Field of Search ................................. 385/134, 136, 385/137, 56, 59, 71

(56) References Cited

U.S. PATENT DOCUMENTS

| | | | | |
|---|---|---|---|---|
| 4,981,336 A | * | 1/1991 | Mohan | ........................ 385/56 |
| 5,185,846 A | | 2/1993 | Basavanhally et al. | |
| 5,913,002 A | | 6/1999 | Jiang | |
| 6,220,074 B1 | * | 4/2001 | Montminy et al. | ........... 72/454 |

\* cited by examiner

*Primary Examiner*—Rodney Bovernick
*Assistant Examiner*—Sarah U. Song
(74) *Attorney, Agent, or Firm*—Blakely, Sokoloff, Taylor & Zafman LLP (57) ABSTRACT

An engager for creating an optical fiber link between a first optical signal carrier secured to a first connector and a second optical signal carrier secured to a second connector, and including a frame structure, a fiber ram block, and a shaft. The fiber ram block has a surface for connection to the second connector. The shaft is rotatably secured to the frame structure. The shaft has a first section of thread for threaded engagement with a second section of thread on a fiber backing member to which the first connector is secured. The shaft has a shoulder which contacts the fiber ram block so that, upon rotation of the first section of thread relative to the second section of thread, the shoulder moves the fiber ram block so that the fiber ram block moves the second connector into engagement with the connector.

22 Claims, 7 Drawing Sheets

APPARATUS FOR CREATING AN OPTICAL FIBER LINK

FIELD OF THE INVENTION

This invention relates to apparatus for creating an optical fiber link.

BACKGROUND OF THE INVENTION

Optical fibers are commonly used in computer networks such as the Internet and telecommunications networks. In order to create a connection between two optical fibers, an end face of one of the optical fibers has to be brought into close proximity of an end face of the other optical fiber. Ends of the optical fibers are usually held captive within connectors. The connectors usually have complementary formations which interengage with one another when the end faces are positioned facing one another and moved closer to one another. The formations which interengage with one another are typically designed so that a certain force has to be overcome to interconnect them with one another and move the end faces towards one another. The interengagement force prevents disengagement of the housings from one another.

SUMMARY OF THE INVENTION

According to one aspect of the invention, an engager for creating an optical fiber link is provided. The engager is for creating an optical fiber link between a first optical signal carrier secured to a first connector and a second optical signal carrier secured to a second connector, and includes a frame structure, a fiber ram block, and a shaft. The fiber ram block has a surface for connection to the second connector. The shaft is rotatably secured to the frame structure. The shaft has a first section of thread for threaded engagement with a second section of thread on a fiber backing member to which the first connector is secured. The shaft has a shoulder which contacts the fiber ram block so that, upon rotation of the first section of thread relative to the second section of thread, the shoulder moves the fiber ram block so that the fiber ram block moves the second connector into engagement with the first connector.

Another mechanism may include a latch with a cam and a handle secured to the cam. An application force can be applied to the handle so that the cam is rotated. The cam is secured to a fiber backing member and has a camming surface which slides on a fiber ram block. The camming surface creates an actuation force on the fiber ram block which is greater than the application force. In another embodiment, a latch or a lever may be used for creating an actuation force greater than an application force. It may also be possible to mount a motor to a frame structure, the shaft being coupled to the motor so that the motor rotates the shaft. The motor may be used instead of or in addition to the handle and crank arm. Another embodiment may include toothed tracks on the side/bottom of the shelf and a motor geared to the tracks. A further embodiment may make use of an electromagnet to draw first and second housings into engagement.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements and wherein.

DETAILED DESCRIPTION

An apparatus for creating optical fiber links is described. In order to engage a first connector carrying a first optical fiber to a second connector carrying a second optical fiber, a certain interengagement force has to be overcome. The interengagement force is typically at least 150 Newtons. A force of such a magnitude is generally too high for purposes of hand assembly. Hand assembly may also cause buckling, bending or shaking of a support frame on which sensitive equipment is located. The apparatus of the invention includes a frame structure that is inserted into a support frame, and engager that is used for connecting second connectors to first connectors. Each second connectors are secured to a housing which is secured to a fiber ram block. Each first connectors are secured to a housing which is secured to a fiber backing member. By interconnecting the fiber backing member and the fiber ram block, and adjusting the fiber ram block towards the fiber backing member, forces are not created on the support frame. According to one embodiment, a shaft having threads thereon is screwed into a member that is secured to the fiber backing member. The shaft has a thrust collar that acts on the fiber ram block. The shaft is connected via a crank arm to a handle. A person can create a force on the handle to create a torque within the shaft that screws the shaft into the member and creates a force between the thrust collar and the fiber ram block. The fiber ram block applies the force to the second housing so that the second housing is moved into engagement with the first housing. An interengagement force is thereby overcome and end faces of the optical fibers are brought closer to one another to create optical links, while minimizing forces on the support frame.

A degree of play is provided to allow for rotation of the handle in an opposite direction than the direction in which the handle is rotated for engaging the second housing with the first housing so that the handle can be stored.

The second housing can be disengaged from the first housing by rotating the handle in such an opposite direction. The thread on the shaft disengages with the thread on the member and springs bias the fiber ram block away to ensure proper disengagement between the threads. The crank arm can be pivoted to create a force in a longitudinal direction of the shaft so that the fiber ram block compresses the springs to again allow for engagement of the threads with one another.

Figure 1:
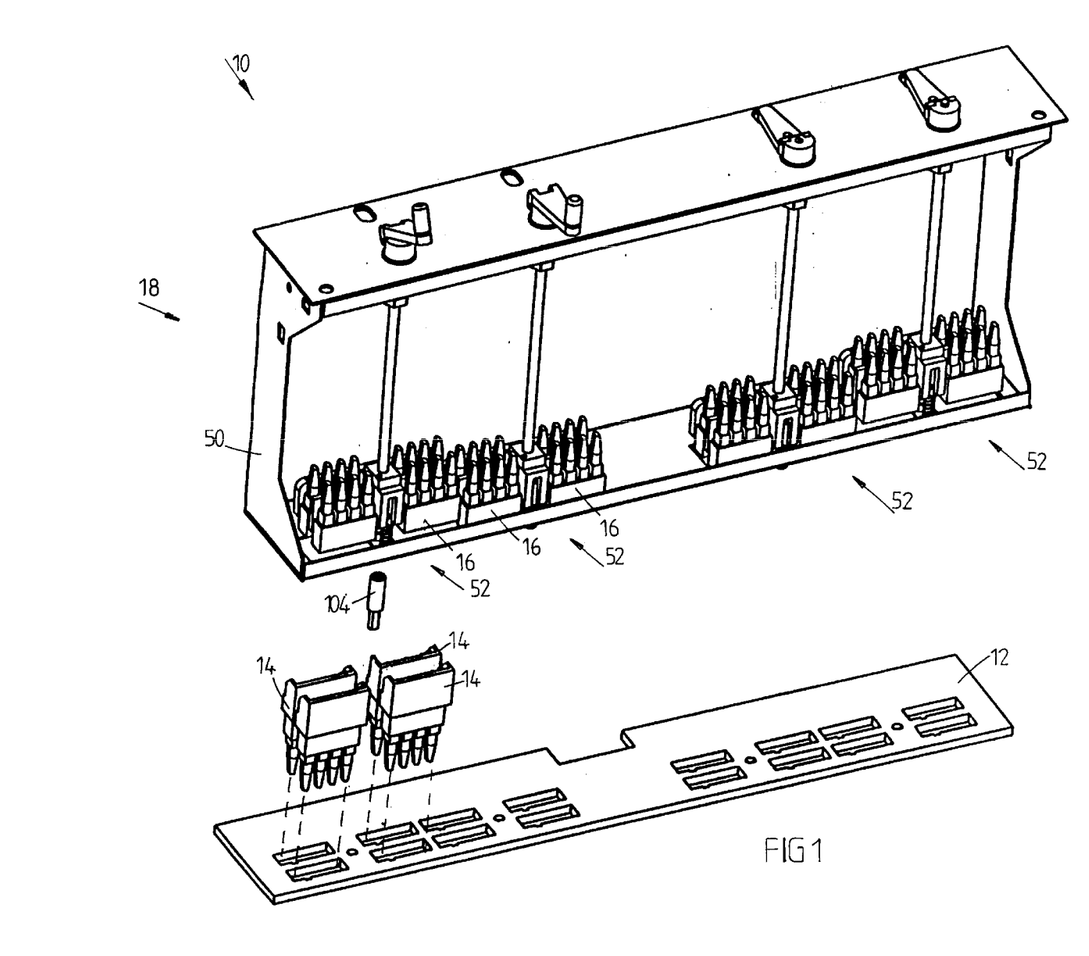
FIG. 1 is a perspective view of apparatus, according to an embodiment of the invention, for creating optical fiber links.

FIG. 1 of the accompanying drawings illustrates apparatus 10, according to an embodiment of the invention, for creating optical fiber links, which includes a fiber backing member 12, a plurality of first fiber assemblies 14, a plurality of second fiber assemblies 16, and an engager 18.

Figure 2:
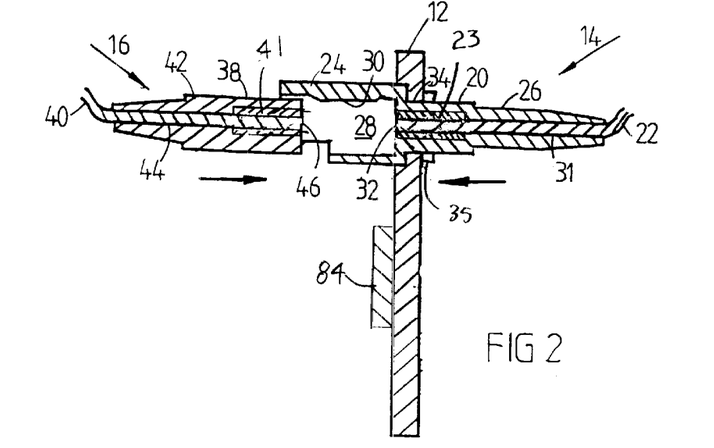
FIG. 2 is a sectioned side view of a fiber backing member and first and second fiber assemblies forming part of the apparatus.

FIG. 2 is a cross-sectional view of the fiber backing member 12, one of the first fiber assemblies 14, and one of the second fiber assemblies 16. FIG. 2 illustrates the first fiber assembly 14 as mounted to the fiber backing member 12 and before the second fiber assembly 16 is connected to the first fiber assembly 14.

The first fiber assembly 14 includes a first housing 20, a first optical signal carrier in the form of a first optical fiber 22, and a first connector 23. The first housing 20 has a front portion 24 and a rear portion 26. The front portion 24 has an opening 28 therein and a first interengagement formation 30 is formed on an inner surface of the opening 28. The first optical fiber 22 is held captive within the first connector 23. The connector 23 is held captive within a passage 31 formed through the rear portion 26. The first optical fiber 22 has a first end face 32 located within the opening 28.

The fiber backing member 12 has a housing opening 34 formed therethrough. The rear portion 26 is inserted through the housing opening 34. The first housing 20 engages with the housing opening 34 with a friction fit so that the first housing is mounted to the fiber backing member 12. A clip 35 is located on the first housing 20 to secure it to the fiber backing member 12.

The second fiber assembly 16 includes a second housing 38, a second optical fiber 40, and a second connector 41. The second housing 38 has an outer surface forming a second interengagement formation 42. The second optical fiber 40 is held captive within the second connector 41. The second connector 41 is held captive within a passage 44 that is formed through the second housing 38. The second optical fiber 40 has a second end face 46 at an end of the second housing 38.

Figure 3:
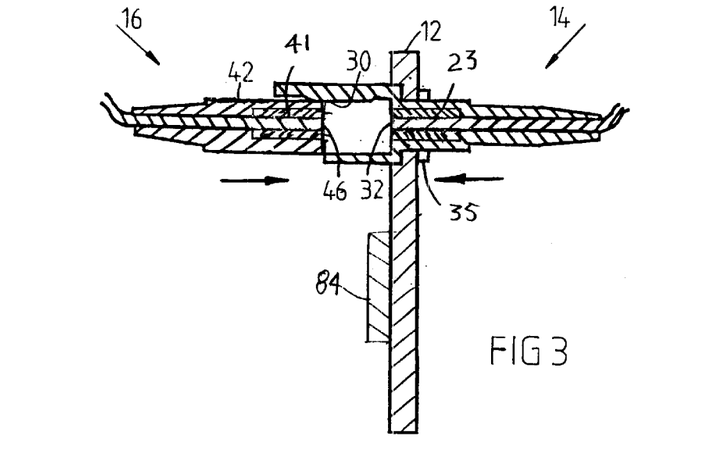
FIG. 3 is a view similar to FIG. 2 wherein the second fiber assembly is moved closer to the first fiber assembly.
Figure 4:
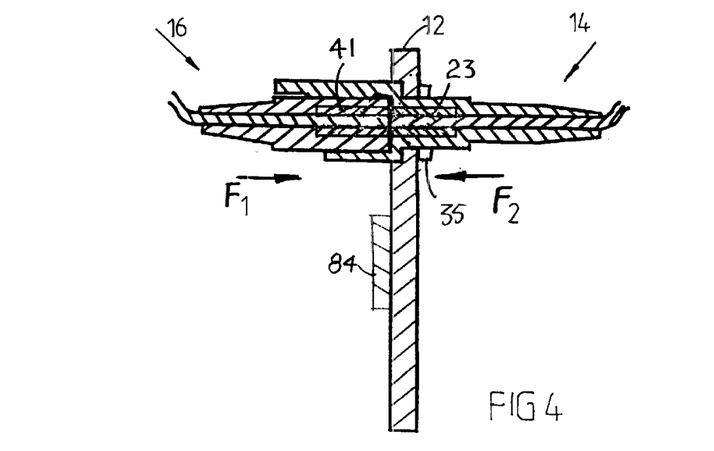
FIG. 4 is a view similar to FIG. 3 wherein the second fiber assembly is moved into a housing of the first fiber assembly against an interengagement force which is created between interengagement formations on first and second connectors.

The second fiber assembly 16 is positioned so that the second end face 46 faces the first end face 32. When the second housing 38 is moved towards the first housing 20, as shown in FIG. 3, the second interengagement formation 42 engages with the first interengagement formation 30. Further movement of the second housing 38 towards the first housing 20, as shown in FIG. 4, results in interengagement of the second interengagement formation 42 with the first interengagement formation 30. A friction force is created between the second interengagement formation 42 and the first interengagement formation 30. In addition, a relatively large friction force is created between formations on the connectors 23 and 41. These formations are in the form of pins and corresponding holes. In order to overcome the friction forces, an interengagement force $F_1$ has to be created between the second housing 38 and the fiber backing member 12 so that the second housing 38 can be moved fully into the opening 28. Such movement of the second housing 38 into the opening 28 moves the second end face 46 closer to the first end face 32 until they contact or at least establish a reliable optical connection for transmission of light signals.

Only one first optical fiber 22 and one second optical fiber 40 are shown. It should however be understood that, as shown in FIG. 1, a total of four first optical fibers 22 are secured to the first housing 20 and a total of four second optical fibers 40 are secured to the second housing 38. For alternative embodiments, any other number of fibers can be used.

The connector system shown in FIG. 2 to FIG. 4 may be an MPX connector system from AMP, Incorporated, Harrisburg, Pa. 17105. The first fiber assembly 14 may be a MPX quad motherboard housing, part number 1278529-1 and the second fiber assembly 16 may be a MPX quad daughterboard housing, part number 1278391-1.

The interengagement force F, which is required for purposes of interconnecting the second connector 41 with the first connector 23 is generally at least 150 Newtons. A force of such a magnitude is generally not too great for purposes of connecting the second connector 41 with the first connector 23 by hand, although simultaneous connection of multiple connectors may be. In addition, by mounting a plurality of the second connectors 41 to a single housing and simultaneously engaging the second connectors 41 with a plurality of first connectors 41 generally results in an increase in magnitude of the interengagement force $F_1$, which is not linear. For example, when two of the second connectors 41 are mounted to one housing and simultaneously engaged with two of the first connectors 23, a required interengagement force $F_1$ is more than 300 Newtons. Such an interengagement force would also be too great for hand assembly. The engager 18 of FIG. 1 includes a mechanism that provides for a manually applied application force to be converted to an actuation force of greater magnitude that is sufficient to overcome the interengagement force $F_1$. Engager 18 includes a frame structure 50 and four ramming devices 52.

Figure 5:
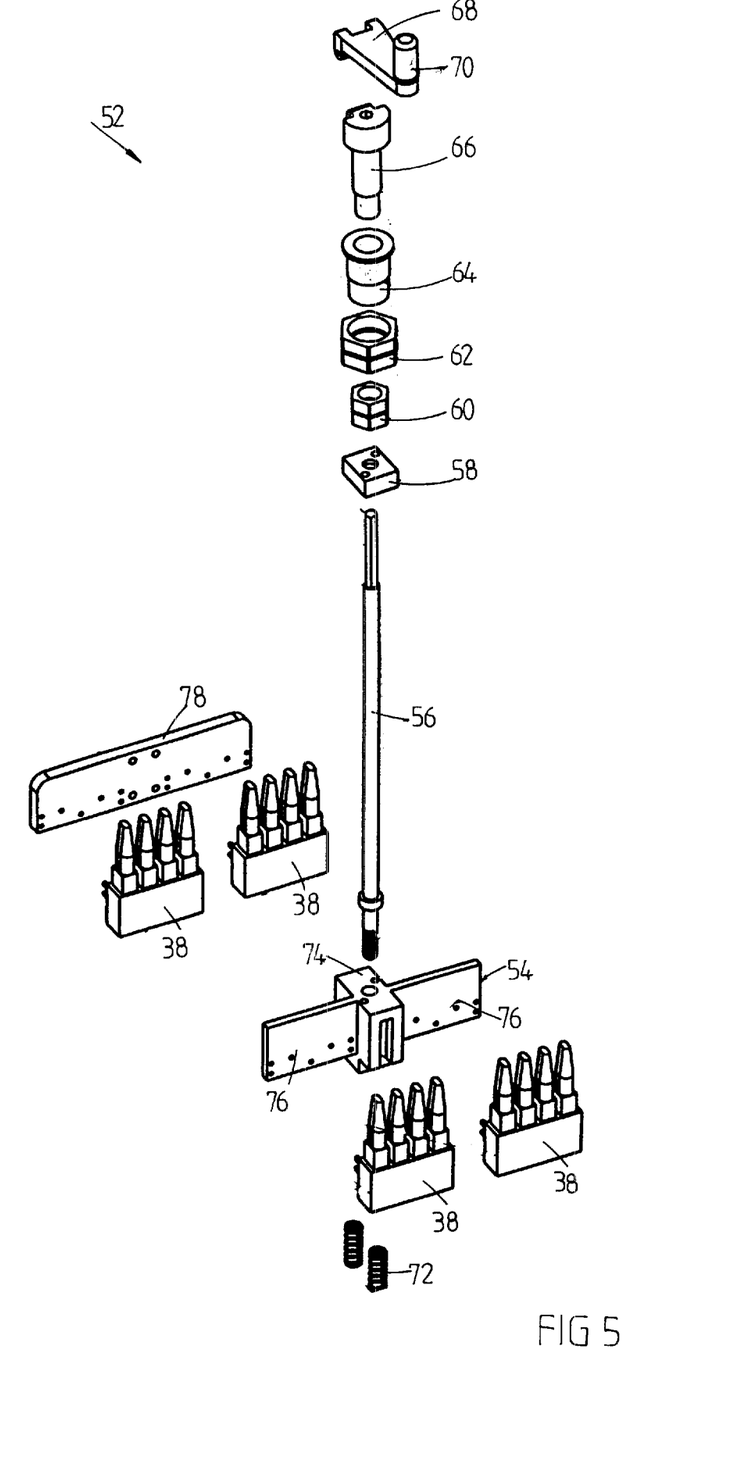
FIG. 5 is an exploded perspective view of one ramming device forming part of the apparatus.

FIG. 5 illustrates one of the ramming devices 52 in more detail. The ramming device 52 includes a fiber ram block 54, a shaft 56, a shaft clamp 58, a crank mount nut 60, a bushing nut 62, a bushing 64, a crank mount 66, a crank arm 68, a handle 70, and springs 72.

The fiber ram block 54 includes a load bearing portion 74 and two mounting flanges 76 extending from the load bearing portion 74. The fiber ram block 54 also includes a mounting plate 78 that is mounted to the load bearing portion 74. A respective one of the second housings 38 is mounted to a respective one of the mounting flanges 76. Two of the second housings 38 are also mounted to the mounting plate 78 on either side of the load bearing portion 74. The fiber ram block 54 and the four second housings 38 are thereby secured to one another as a unit.

Figure 6:
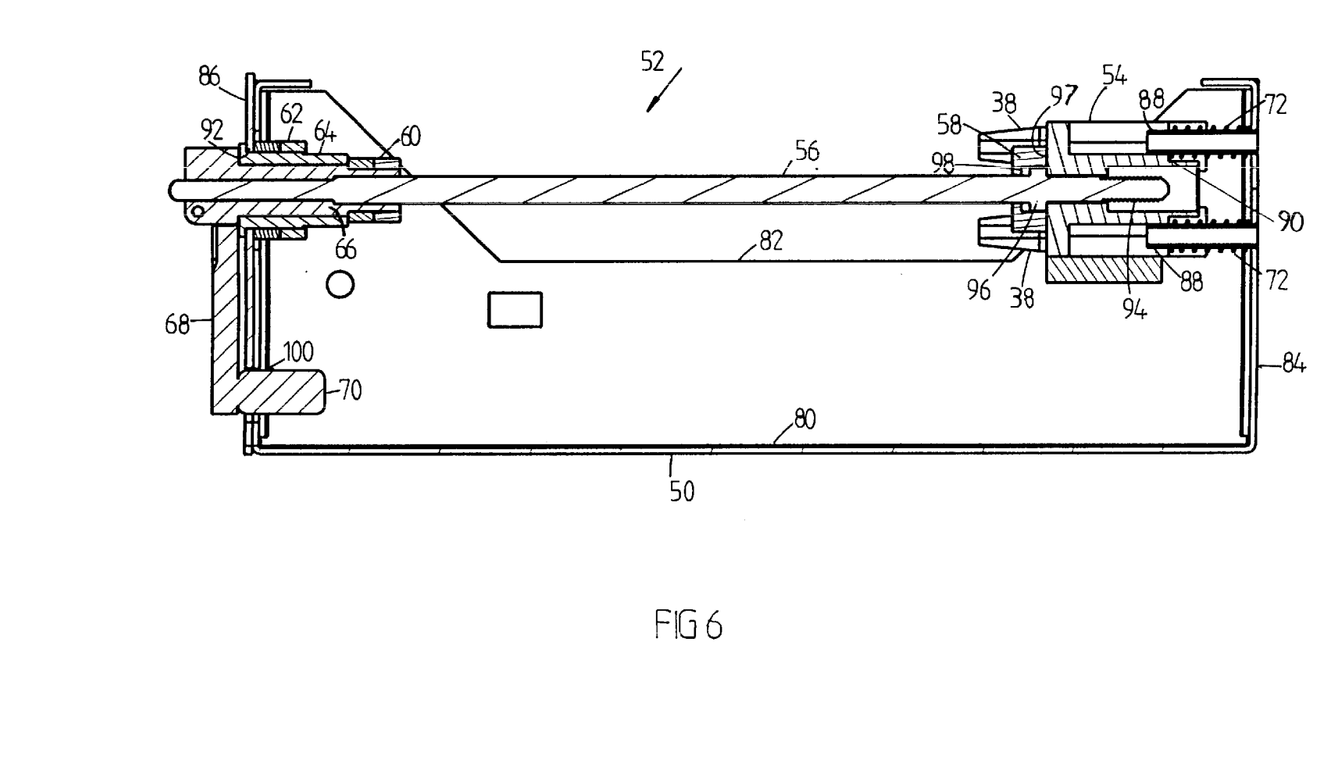
FIG. 6 is a sectioned side view of an engager forming part of the apparatus, showing a frame structure and one of the ramming devices of FIG. 5, wherein a handle thereof is located in a storage position.

FIG. 6 illustrates the engager 18 with the frame structure 50, the ramming device 52, and the second housings 38 assembled.

The frame structure 50 is in a form of a container with a base portion 80, sidewall portions 82, and first and second endwall portions 84 and 86. The first and second endwall portions 84 and 86 are located on opposing sides of the frame structure 50 and are located in planes that are substantially parallel to each other.

Pins 88 are secured to the first endwall portion 84 and extend from the first endwall portion 84 towards the second endwall portion 86. The springs 72 are coil springs and a respective one of the springs 72 is located around a respective one of the pins 88. The fiber ram block 54 is positioned so that surfaces 90 thereof are located against the springs 72 and the pins 88 keep the fiber ram block 54 in such a position. The springs 72 are thus located between the surfaces 90 and the first endwall portion 84.

The shaft 56 is inserted through a bushing opening 92 in the second endwall portion 86. The bushing nut 62, the crank mount nut 60, and the shaft clamp 58 are then located on the shaft 56. The shaft 56 has one end having a first section of thread 94 on an outer surface thereof. The end with a first section of thread 94 is inserted through an opening in the fiber ram block 54. The shaft 56 has a thrust shoulder 96 which rests against a surface 97 of the fiber ram block 54. The shaft clamp 58 has a recess 98 therein which is sized to fit over the shoulder 96. The shaft clamp 58 is positioned with the recess 98 over the shoulder 96 and secured to the fiber ram block 54 utilizing fasteners such as bolts, screws, or the like.

Figure 6A:
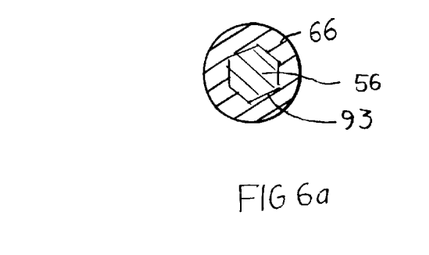
FIG. 6a is a sectioned end view through a shaft and crank mount of the ramming device.

At an opposing end of the shaft 56, the bushing 64 is located through the bushing opening 92 over the shaft 56 and the crank mount 66 is located within the bushing 64 over the shaft 56. The bushing nut 62 is then screwed onto the bushing 64 so as to secure the bushing 64 to the second endwall portion 86. The crank mount nut 60 is then screwed onto the crank mount 66 to prevent the crank mount 66 from moving out of the bushing 64. The crank mount 66 is rotatable within the bushing 64. As shown in FIG. 6a, a hexagonal formation 93 on the shaft 56 engages with a complementary hexagonal formation within the crank mount 66 to prevent rotation of the shaft 56 relative to the crank mount 66. The shaft 56 is however slidably movable in an elongate direction of the shaft 56 relative to the crank mount 66.

The crank arm 68 has one end which is pivotally secured to the crank mount 66. The handle 70 is secured to an opposing end of the crank arm 68. The handle 70 and the crank arm 68 are shown in FIG. 6 in a storage position. In the storage position, the shaft 56 and the handle 70 extend from the crank arm 68 in substantially the same direction and the handle 70 is inserted through a handle storage opening 100 in the second endwall portion 86.

Figure 7:
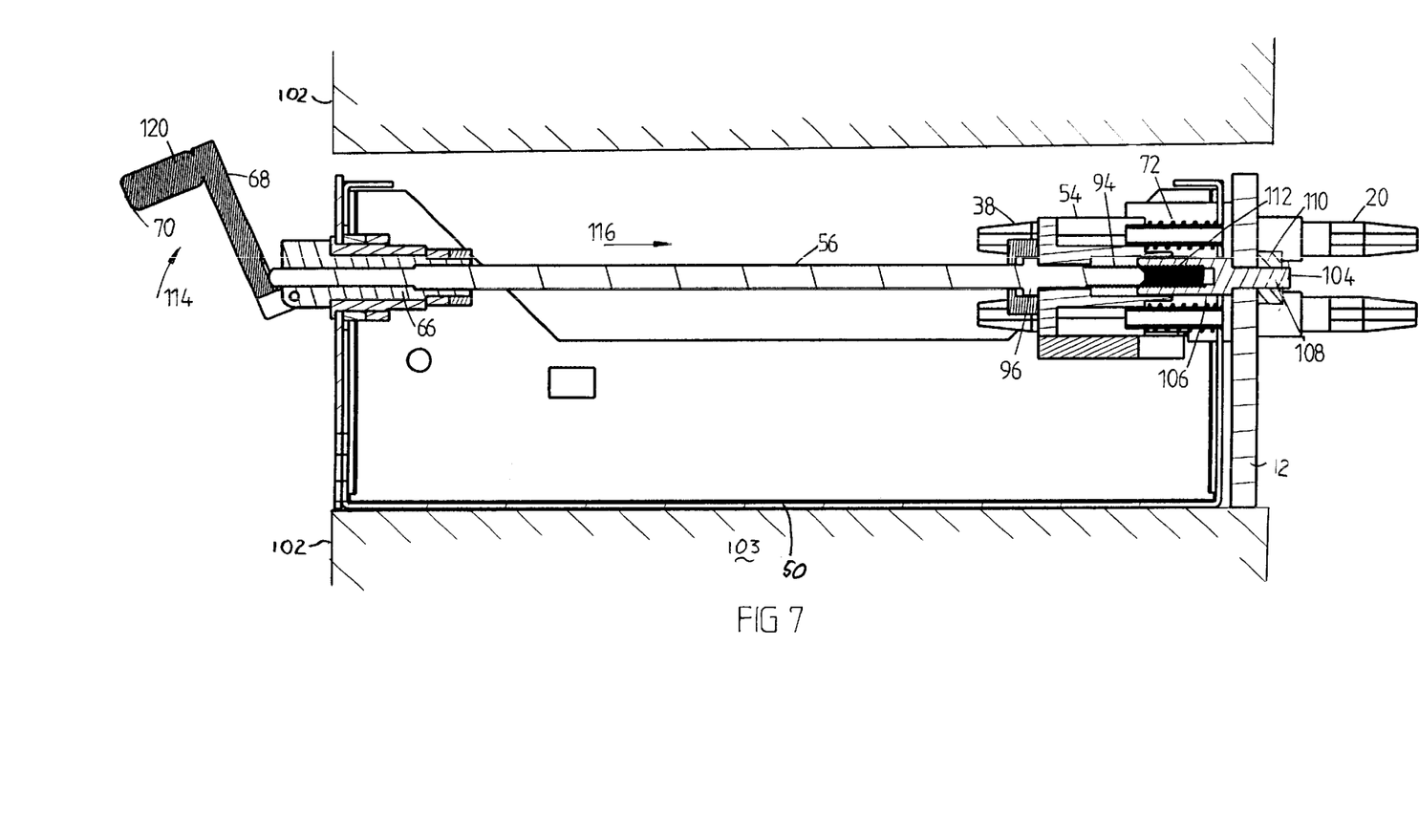
FIG. 7 is a sectioned side view wherein the engager is located next to the fiber backing member and the handle is moved into an operational position.

FIG. 7 illustrate s the engager 18 when it is inserted into a support frame 102 having a shelf 103. The fiber backing member 12 is secured within and to the support frame. The frame structure 50 is located on the shelf 103 next to the fiber backing member 12. A connection member 104 is provided for connecting the shaft 56 to the fiber backing member 12. The connection member 104 has a front section 106 and a rear section 108. The rear section 108 is inserted through an opening in the fiber backing member 12 and a connector nut 110 is screwed onto the rear section 108. The front section 106 has a hole therein with an inner surface with a second section of thread 112 thereon. The connection member 104 is thereby secured to the fiber backing member 12. Interengaging formations (not shown) on the fiber backing member 12 and the rear section 108 prevent rotation of the connector member 104 relative to the fiber backing member 12.

The fiber ram block 54 is initially biased by the springs 72 away from the first endwall portion 84 so that the first section of thread 94 is spaced from the second section of thread 112. The crank arm 68 is then pivoted in a direction 114 into an operational position. An end of the shaft 56 protrudes from the crank mount 66 so that the crank arm 68 contacts the end of the shaft 56. Further movement of the crank arm 68 in the direction 114 moves the shaft 56 so that it slides within the crank mount 66 in a direction 116 which is in an elongate direction of the shaft 56. The thrust shoulder 96 on the shaft 56 pushes against and creates a small force on the fiber ram block 54. The fiber ram block 54 compresses the springs 72 and the first section of thread 94 is moved closer to the second section of thread 112 until they contact one another. A small compressive force is created within the shaft and an equal tensile force is created in the sidewall 82 and base 80 of the frame structure 50. The crank arm 68 extends in a direction which is transverse to an elongate direction of the shaft 56 and the handle 70 extends in a direction which is transverse to a direction in which the crank arm 68 extends. The handle 70 and the shaft 56 extend in opposite directions from the crank arm 68. The handle 70 has a grip 120. A person can hold onto the grip 120 and rotate the handle 70, the crank arm 68, the crank mount 66, and the shaft 56 about an axis of the shaft 56. Rotation of the shaft 56 causes engagement of the first section of thread 94 with the second section of thread 112.

Figures 8, 9:
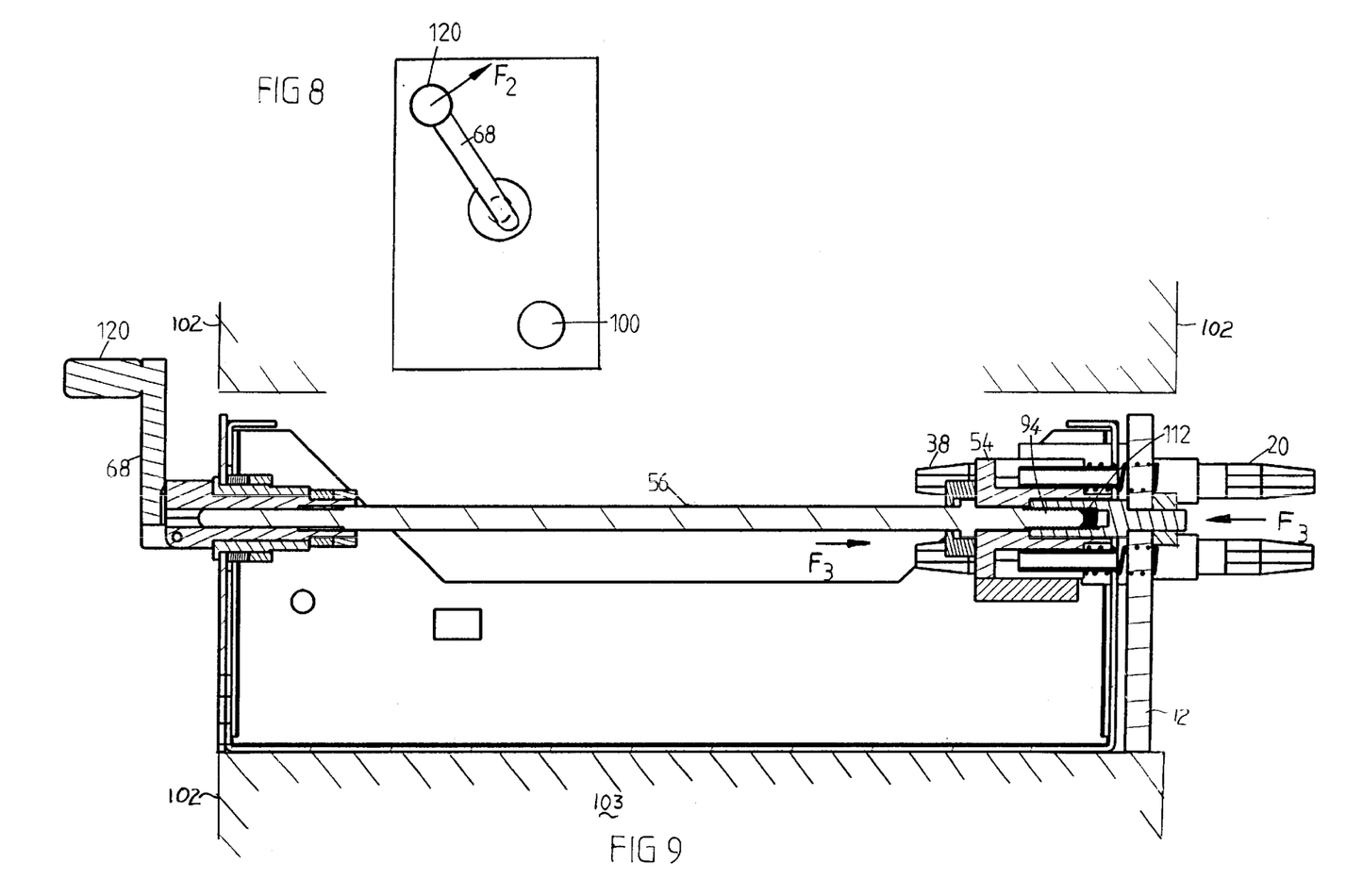
FIG. 8 is a front view illustrating the frame structure and the handle when an application force is applied to the handle.
FIG. 9 is a sectioned side view when the application force is applied to the handle to create an actuation force which engages the second fiber assembly with the first fiber assembly by screwing thread on a shaft into thread of a connector member.

As shown in FIG. 8, the person can apply an application force $F_2$ to the handle 70 in a direction which is at right angles to a direction in which the crank arm 68 extends. As shown in FIG. 9, rotation of the shaft 56 causes sliding movement of the first section of thread 94 on the second section of thread 112, i.e. the first section of thread 94 is screwed into the second section of thread 112. The actuator 18 is thereby secured to the fiber backing member 12. Because the first section of thread 94 is screwed into the second section of thread 112, the shaft 56 moves in a direction towards the fiber backing member 12 and creates an actuation force $F_3$ on the fiber ram block 54. The actuation force $F_3$ is sufficient to overcome the interengagement force ($F_1$ in FIG. 4) which is needed to interengage the second housings 38 with the first housings 20.

An advantage of the invention is that the actuation force $F_3$ has a magnitude which is higher than the application force $F_2$. A person can thus apply a relatively low application force $F_2$ and still generate an actuation force $F_3$ which is sufficient to overcome an interengagement force for connecting the second housings 38 and second connectors 41 with the first housings 20 and the first connectors 23.

It should also be noted that the only forces being created are in components of the engager 18, and in the fiber backing member 12. No forces act on the support frame 102. Bending, buckling or shaking of the support frame 102 is so avoided. Any sensitive equipment located on other areas of the support frame 102 can remain undisturbed during engagement of the housings 38 and 20 with one another.

Figure 10:
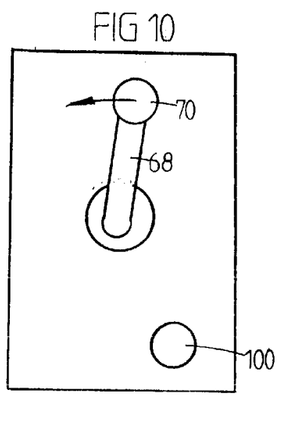
FIG. 10 is a front view illustrating the positioning of the handle relative to a handle storage opening after engagement of the second fiber assembly with the first fiber assembly.
Figure 11:
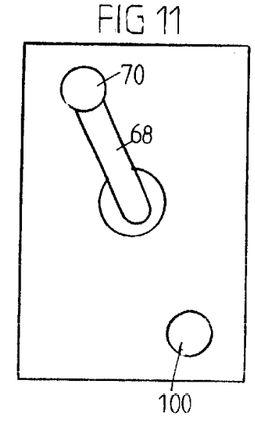
FIG. 11 is a view similar to FIG. 10 wherein the handle is rotated so that the handle, the shaft, and the handle storage opening are located in line.

Referring now to FIG. 10, it may occur that, once the first and second housing 20 and 38 are engaged with one another, the handle 70 is not directly aligned with the handle storage opening 100. The handle 70 may thus have to be rotated into a position as shown in FIG. 11 wherein the handle 70 and the handle storage opening 100 are aligned with the shaft 56.

Figure 12:
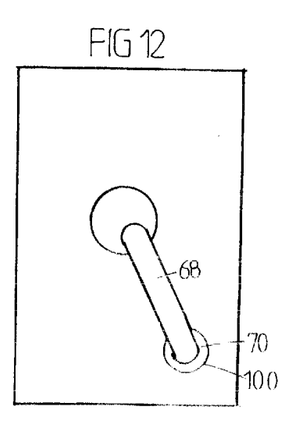
FIG. 12 is a view similar to FIG. 11 after pivoting of a crank arm so that the handle is located in the handle storage opening.
Figure 13:
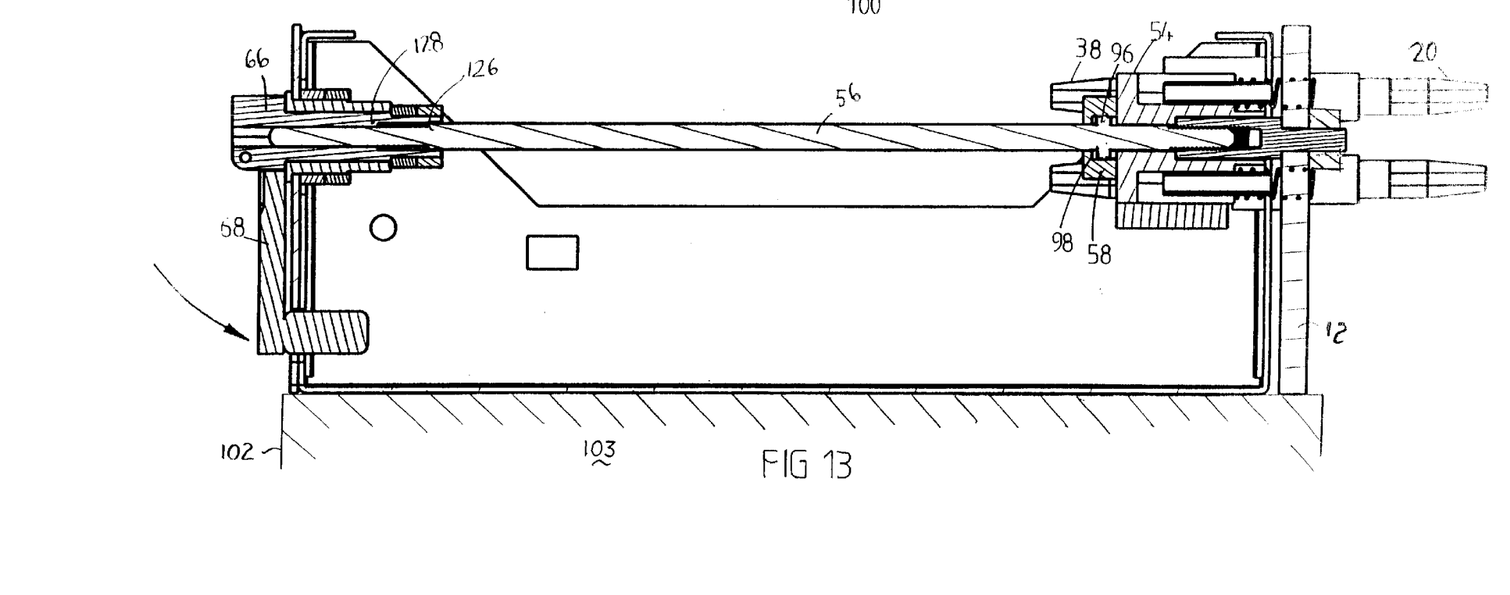
FIG. 13 is a sectioned side view illustrating play which is provided for a thrust collar on the shaft to allow for rotation of the handle as shown in FIG. 11 without disengagement of the second fiber assembly from the first fiber assembly.

When the crank arm 68 is then pivoted into a storage position, as shown in FIG. 12, the handle 70 fits into the handle storage opening 100. In order to prevent movement of the second optical housings 38 from the first optical housings 20, a degree of play is provided for rotating the handle 70 without movement of the second housings 38 away from the first housings 20. The recess 98 in the shaft clamp 58 is sufficiently deep to allow for movement of the thrust collar 96 away from the fiber ram block 54 without pulling the fiber ram block 54 away from the fiber backing member 12. The recess 98 is sufficiently deep to allow for at least one full revolution of the handle 70 without the thrust collar 96 contacting a base of the recess 98.

In order to disengage the second housing 38 from the first housing 20, the crank arm 68 is again pivoted into its operational position as shown in FIG. 9. The handle 70 is then rotated in an opposite direction as the direction in which it is rotated for engaging the second housing 38 with the first housing 20. Rotation of the handle causes the thrust shoulder 96 to contact a base of the recess 98 and apply a force thereto which is sufficient to pull the second housing 38 out of the first housing 20. Since no clips or other retainers are provided, only a friction force between the housings 38 and 20 has to be overcome. Another embodiment may include clips which first have to be disengaged. Rotation of the handle 70 is continued until the first section of thread 94 moves out of the second section of thread 112. The springs 72 are still compressed at the moment when the first section of thread 94 leaves the second section of thread 112. The springs 72 then immediately bias the fiber ram block 54 away from the fiber backing member 12. Proper disengagement of the first section of thread 94 from the second section of thread 112 is thus ensured. The shaft 56 moves lengthwise into the crank mount. A limiting collar 126 on the shaft 56 contacts a step 128 in the crank mount 66 so that movement of the shaft 56 through the crank mount 66 is limited. The first and second sections of thread 94 and 112 can again be engaged as discussed in the reference to FIG. 7.

In the foregoing specification, the invention has been described with reference to specific exemplary embodiments thereof. It will, however, be evident that various modifications and changes may be made thereto without departing from the broader spirit and scope of the invention as set forth in the appended claims. Alternative embodiments of the invention are contemplated. Another mechanism may include a latch with a cam and a handle secured to the cam. An application force can be applied to the handle so that the cam is rotated. The cam is secured to a fiber backing member and has a camming surface which slides on a fiber ram block. The camming surface creates an actuation force on the fiber ram block which is greater than the application force. In another embodiment, a latch or a lever may be used for creating an actuation force greater than an application force. It may also be possible to mount a motor to a frame structure, the shaft being coupled to the motor so that the motor rotates the shaft. The motor may be used instead of or in addition to the handle and crank arm. Another embodiment may include toothed tracks on the side/bottom of the support frame and a motor geared to the tracks. A further embodiment may make use of an electromagnet to draw first and second housings into engagement.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An engager for creating an optical fiber link between a first optical signal carrier secured to a first connector and a second optical signal carrier secured to a second connector, comprising a frame structure;

a fiber ram block having a surface for connecting to the second connector;

a shaft rotatably secured to the frame structure, the shaft having a first section of thread for threaded engagement with a second section of thread on a fiber backing member to which the first connector is secured, and a shoulder which contacts the fiber ram block so that, upon rotation of the first section of thread relative to the second section of thread, the shoulder moves the fiber ram block so that the fiber ram block moves the second connector into engagement with the first connector.

2. The engager of claim 1, further comprising: means for rotating the shaft.

3. The engager of claim 2, wherein the means for rotating the shaft includes a handle with a grip to which an application force can be applied.

4. The engager of claim 3, wherein the means for rotating the shaft includes a crank arm extending transversely from the shaft with the handle located on an end of the crank arm opposing the shaft.

5. The engager of claim 3, further comprising:

a crank mount which is rotatably secured to the second portion the shaft being secured to the crank mount for movement in a longitudinal direction relative to the crank mount and for rotation with the crank mount, the shaft being connected to the second connector so that the second connector moves together with the shaft towards the first connector, the crank arm being pivotally secured to the crank mount so that, upon pivoting of the crank arm, the crank arm moves the shaft so that the first section of thread is moved into contact with the second section of thread, thereby allowing the first section of thread to be threadably engaged with the second section of thread upon rotation of the shaft.

6. An apparatus for creating an optical fiber link, comprising:

a fiber backing member;

a first connector having a first interengagement formation;

a first optical signal carrier, having a first end face, secured to the first connector, the first connector being mounted to the fiber backing member;

a second connector having a second interengagement formation;

a second optical signal carrier, having a second end face, secured to the second connector, the second connector being positioned relative to the first connector so that the second end face faces the first end face, movement of the second connector towards the first connector causing interengagement of the second interengagement formation with the first interengagement formation against a first interengagement force which resists interengagement of the second interengagement formation with the first interengagement formation and movement of the second connector towards the first connector;

a handle having a grip for manually applying an application force;

a shaft that is rotated by the handle, the shaft having a first section of thread; and a connection member on the fiber backing member, the connection member having a second section of thread that interengages with the first section of thread, rotation of the shaft causing sliding movement of the first section of the thread over the second section of thread in a first direction to create an actuation force of higher magnitude than the application force, and applying the actuation force to the second connector, the application force overcoming the first interengagement force so that the second interengagement formation interengages with the first interengagement formation and the second end face is moved closer to the first end face.

7. The apparatus of claim 6, wherein sliding movement of the first section of thread over the second section of thread causes movement of the shaft in a longitudinal direction thereof relative to the fiber backing member, the shaft being connected to the second connector so that the second connector moves together with the shaft towards the first connector.

8. The apparatus of claim 6, further comprising:

a crank arm having one end connected to the shaft and an opposing end connected to the handle, the crank arm extending from the shaft in a direction which is transverse to a longitudinal direction of the shaft.

9. The apparatus of claim 8, further comprising:

a frame structure having at least first and second portions, the first portion being secured to the fiber backing member;

a crank mount which is rotatably secured to the second portion, the shaft being secured to the crank mount for movement in a longitudinal direction thereof relative to the crank mount and for rotation with the crank mount, the shaft being connected to the second connector so that the second connector moves together with the shaft towards the first connector, the crank arm being pivotally secured to the crank mount so that, upon pivoting of the crank arm, the crank arm moves the shaft so that the first section of thread is moved into contact with the second section of thread, thereby allowing the first section of thread to be threadably engaged with the second section of thread upon rotation of the shaft.

10. The apparatus of claim 9, further comprising:

at least one spring, the first section of thread disengaging from the second section of thread when the first section of thread slides over the second section of thread in a second direction opposing the first direction, the spring biasing the shaft in a longitudinal direction thereof and in a direction wherein the first section of thread is moved away from the second section of thread.

11. The apparatus of claim 6, further comprising:

at least one spring, the first section of thread disengaging from the second section of thread when the first section of thread slides over the second section of thread in a second direction opposing the first direction, the spring biasing the shaft in a longitudinal direction thereof and in a direction wherein the first section of thread is moved away from the second section of thread.

12. The apparatus of claim 6, wherein the first section of thread is located on an outer surface of the shaft, and the connection member has an inner surface with the second section of thread located on the inner surface of the connection member.

13. The apparatus of claim 8, further comprising:

a frame structure having at least first and second portions, the first portion being secured to the fiber backing member, the shaft having an end secured to the second portion;

a crank arm having one end pivotally secured to the end of the shaft, the handle being secured to the crank arm and extending transversely to the crank arm, the crank arm pivoting between an operational position wherein the handle and the shaft extend substantially in opposite directions from the crank arm, and a storage position wherein the handle and the shaft extend in substantially the same direction from the crank arm.

14. The apparatus of claim 13, wherein the second portion has a handle storage opening therein for locating the handle; wherein a degree of play is provided for rotating the handle without movement of the second connector away from the first connector, to allow for the handle to be located in the handle storage opening when the crank arm is pivoted into the storage position.

15. The apparatus of claim 6, comprising:

a first housing;

a plurality of said first optical signal carriers secured to the first housing;

a second housing; and a plurality of said second signal carriers mounted to the second housing.

16. The apparatus of claim 6, further comprising:

a third connector having a third interengagement formation;

a third optical signal carrier, having a third end face, secured to the third connector, the third connector being mounted to the fiber backing member;

a fourth connector having a fourth interengagement formation;

a fourth optical signal carrier, having a fourth end face, secured to the fourth connector, the fourth connector being positioned relative to the third connector so that the fourth end face faces the third end face, movement of the fourth connector towards the third connector causing interengagement of the fourth interengagement formation with the third interengagement formation against a second interengagement force which resists interengagement of the fourth interengagement formation with the third interengagement formation and movement of the fourth connector towards the third connector, the actuation force being applied to the fourth connector so that the fourth connector is moved towards the third connector, the application force overcoming the second interengagement force so that the fourth interengagement formation interengages with the third interengagement formation and the fourth end face is moved closer to the third end face.

17. An apparatus for creating optical fiber links, comprising:

a fiber backing member;

a plurality of first connectors, each having a first interengagement formation;

a plurality of first optical signal carriers, each first optical signal carrier having a first end face and each first optical signal carrier being secured to a respective one of the first connectors, the first connectors being mounted to the fiber backing member;

a fiber ram block;

a plurality of second connectors, each having a second interengagement formation;

a plurality of second optical signal carriers, each second optical signal carrier having a second end face and each second optical signal carrier being secured to a respective one of the second connectors, wherein each second connector is mounted to the fiber ram block which is positioned so that each second end face faces each first end face, movement of the fiber ram block towards the fiber backing member causing interengagement of each second interengagement formation with a respective first interengagement formation against an interengagement force which resists interengagement of the second interengagement formation with the first interengagement formation and movement of the second connector towards the first connector;

a handle having a grip for manually applying an application force; and a mechanism which interconnects the handle with fiber ram block, the mechanism converting the application force to an actuation force of higher magnitude than the application force and applying the actuation force to the fiber ram block so that each second connector is moved towards a respective first connector, the application force overcoming the interengagement forces so that each second interengagement formation interengages with a respective first interengagement formation and each second end face is moved closer to a respective first end face.

18. An apparatus for creating an optical fiber link, comprising:

a support frame;

a fiber backing member secured to the support frame;

a plurality of first connectors, each having a first interengagement formation;

a plurality of first optical signal carriers, each having a first end face and each being secured to a respective one of the first connectors, the first connectors being mounted to the fiber backing member;

a frame structure which is insertable into the support frame;

a fiber ram block which is mounted to the frame structure and being movable relative to the frame structure;

a plurality of second connectors, each having a second interengagement formation;

a plurality of second optical signal carriers, each having a second end face and each being secured to a respective one of the second connectors, wherein each second connector is mounted to the fiber ram block which is positioned so that each second end face faces a respective first end face, movement of the fiber ram block towards the fiber backing member causing interengagement of each second interengagement formation with a respective first interengagement formation against an interengagement force which resists interengagement of the second interengagement formation with the first interengagement formation and movement of the second connector towards the first connector;

a first engager component secured to the fiber backing member; and a second engager component secured to the fiber ram block, the second engager component being connected to the first engager component and being adjustable relative to the first engager component so as to move the fiber ram block relative to the frame structure, resulting in movement of the second connectors towards the first connectors so that each second interengagement formation engages with a respective first interengagement formation and each second end face moves closer to a respective first end face such that forces on the support frame are minimized.

19. The apparatus of claim 18, further comprising:

a screw, the first engager component being a thrust collar on the screw and the second engager component being a connector nut on the fiber backing member, the screw having thread which slides on thread of the connector nut.

20. A method of creating an optical fiber link, comprising:

gripping a handle; and applying an application force to the handle, the handle rotating a shaft that converts the application force to an actuation force of greater magnitude than the application force, the actuation force moving a first connector towards a second connector so that a first interengagement formation on the first connector interengages with a second interengagement formation on the second connector, the actuation force overcoming an interengagement force which resists interengagement of the second interengagement formation with the first interengagement formation and movement of the second connector towards the first connector, a first optical signal carrier being secured to the first connector and having a first end face, and a second optical signal carrier being-secured to the second connector and having a second end face facing the first end face, the second end face moving closer to the first end face.

21. A method of creating an optical fiber link, comprising:

inserting a frame structure into a support frame;

connecting a first engager component to a second engager component; and adjusting the second engager component relative to the first engager component, the first engager component being secured to a fiber backing member secured to the frame structure and the second engager component being connected to a fiber ram block so that the fiber ram block moves relative to the frame structure, a plurality of first connectors being secured to the fiber backing member and a plurality of second connectors being secured to the fiber ram block, each connector having a respective optical signal carrier secured thereto so that respective ones of the connectors engage with one another and end faces of the optical signal carriers are moved towards one another.

22. An apparatus for creating an optical fiber link, comprising:

a fiber backing member;

a plurality of first connectors, each having a respective first interengagement formation;

a plurality of first optical signal carriers, each having a respective first end face, secured to a respective first connector, the first connectors being mounted to the fiber backing member;

a fiber ram block;

a plurality of second connectors, each having a respective second interengagement formation;

a plurality of second optical signal carriers, each having a respective second end face, secured to a respective second connector, the second connectors being mounted to the fiber ram block and being positioned relative to the first connectors so that each second end face faces a respective first end face, movement of each respective second connector toward a corresponding respective first connector causing interengagement of the respective second interengagement formation with the respective first interengagement formation thereof against a first interengagement force which resists interengagement of the respective second interengagement formation with the respective first interengagement formation and movement of the respective second connector toward the respective first connector;

a handle having a grip for manually applying an application force; and a mechanism which interconnects the handle with the fiber ram block, the mechanism converting the application force to an actuation force of higher magnitude than the application force, and applying the actuation force to the fiber ram block, the actuation force overcoming the first interengagement forces so that the respective second interengagement formations of more than one of the second connectors simultaneously interengage with the respective first interengagement formations of more than one of the first connectors and the second end faces of more than one of the second optical signal carriers are simultaneously moved closer to the first end face of more than one of the first optical signal carriers.

* * * * *